(12) United States Patent
Shelton et al.

(10) Patent No.: US 11,067,179 B2
(45) Date of Patent: Jul. 20, 2021

(54) DOUBLE POSITIVE ISOLATION BALL VALVE

(71) Applicant: Cameron International Corporation, Houston, TX (US)

(72) Inventors: William S. Shelton, Houston, TX (US); Christian Meade, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 15/445,860

(22) Filed: Feb. 28, 2017

(65) Prior Publication Data

US 2018/0245697 A1 Aug. 30, 2018

(51) Int. Cl.
| | |
|---|---|
| F16K 5/06 | (2006.01) |
| F16K 27/06 | (2006.01) |
| F16K 5/18 | (2006.01) |
| F16K 5/20 | (2006.01) |

(52) U.S. Cl.
CPC .............. *F16K 5/0636* (2013.01); *F16K 5/06* (2013.01); *F16K 5/0647* (2013.01); *F16K 5/0689* (2013.01); *F16K 5/185* (2013.01); *F16K 5/202* (2013.01); *F16K 27/06* (2013.01)

(58) Field of Classification Search
CPC ... F16K 5/14; F16K 5/20; F16K 5/204; F16K 5/202; F16K 5/0605; F16K 5/0689; F16K 5/0678; F16K 5/0694
See application file for complete search history.

(56) References Cited

U.S. PATENT DOCUMENTS

| | | | | |
|---|---|---|---|---|
| 2,383,549 | A * | 8/1945 | Hilker | F16K 5/162 74/22 R |
| 3,058,484 | A * | 10/1962 | Feiring | F16K 5/202 137/328 |
| 3,100,501 | A * | 8/1963 | Hansen | F16K 5/0689 137/454.6 |
| 3,168,279 | A * | 2/1965 | Anderson | F16K 5/202 251/181 |

(Continued)

FOREIGN PATENT DOCUMENTS

| | | |
|---|---|---|
| AT | 247091 B | 5/1966 |
| CN | 204420164 U | 6/2015 |

(Continued)

OTHER PUBLICATIONS

PCT Search Report and Written Opinion for PCT/US2018/018876 dated May 29, 2018; 13 pages.

(Continued)

*Primary Examiner* — Marina A Tietjen
(74) *Attorney, Agent, or Firm* — Helene Raybaud

(57) ABSTRACT

The disclosed embodiments relate to a valve assembly that includes a valve body that has a cavity having one or more seating surfaces, a ball body disposed within the valve body and configured to engage the one or more seating surfaces to form a seal, and an actuator configured to drive the ball body in a first axial direction along a central axis of the cavity to wedge the ball body against the one or more seating surfaces to form the seal, and where the actuator is configured to move the ball body in a second axial direction along the central axis to unseat the ball body and to rotate the ball body about the central axis between an open position and a closed position.

20 Claims, 8 Drawing Sheets

(56) References Cited

U.S. PATENT DOCUMENTS

| | | | | |
|---|---|---|---|---|
| 3,168,900 A | * | 2/1965 | Hansen | F16K 5/0689 |
| | | | | 137/454.6 |
| 3,173,648 A | * | 3/1965 | McGuire | F16K 5/0673 |
| | | | | 251/188 |
| 3,179,121 A | * | 4/1965 | Bredtschneider | F16K 5/202 |
| | | | | 137/454.6 |
| 3,227,174 A | * | 1/1966 | Yost | F16K 5/0657 |
| | | | | 137/375 |
| 3,231,235 A | * | 1/1966 | Anderson | F16K 5/202 |
| | | | | 251/214 |
| 3,273,852 A | * | 9/1966 | Ripert | F16K 5/202 |
| | | | | 251/171 |
| 3,339,884 A | * | 9/1967 | Smith | F16K 5/202 |
| | | | | 251/161 |
| 3,425,663 A | * | 2/1969 | Priese | F16K 5/202 |
| | | | | 251/180 |
| 3,429,553 A | | 2/1969 | Smith et al. | |
| 3,439,897 A | * | 4/1969 | Priese | F16K 5/202 |
| | | | | 251/170 |
| 3,463,446 A | | 8/1969 | Natho | |
| 3,472,271 A | * | 10/1969 | Allen | F16K 5/0636 |
| | | | | 137/329.05 |
| 3,488,033 A | * | 1/1970 | Priese | F16K 5/202 |
| | | | | 251/172 |
| 3,515,371 A | | 6/1970 | King et al. | |
| 3,537,682 A | * | 11/1970 | Priese | F16K 5/06 |
| | | | | 137/375 |
| 3,592,440 A | * | 7/1971 | McFarland | B22F 3/26 |
| | | | | 251/170 |
| 3,682,439 A | * | 8/1972 | Neto | F16K 5/0689 |
| | | | | 251/315.05 |
| 3,761,052 A | * | 9/1973 | Tobbe | F16K 3/22 |
| | | | | 251/88 |
| 3,795,385 A | * | 3/1974 | Westenrieder | F16K 5/202 |
| | | | | 251/159 |
| 3,814,381 A | * | 6/1974 | Yopp | F16K 5/202 |
| | | | | 251/315.03 |
| 3,838,844 A | * | 10/1974 | Arn | F16K 5/202 |
| | | | | 251/174 |
| 3,920,036 A | * | 11/1975 | Westenrieder | F16K 5/0636 |
| | | | | 137/315.21 |
| 4,004,776 A | * | 1/1977 | Stender | F16K 5/0615 |
| | | | | 137/375 |
| 4,103,867 A | * | 8/1978 | Orr | F16K 5/204 |
| | | | | 251/180 |
| 4,203,460 A | * | 5/1980 | Priese | F16K 5/0647 |
| | | | | 137/240 |
| 4,253,640 A | | 3/1981 | Priese et al. | |
| 4,320,890 A | | 3/1982 | Meyer et al. | |
| 4,350,322 A | | 9/1982 | Mueller | |
| 4,579,316 A | | 4/1986 | Velan | |
| 4,580,762 A | * | 4/1986 | Hirtz | F16K 5/202 |
| | | | | 251/159 |
| 4,802,652 A | * | 2/1989 | Kaniut | F16K 5/0636 |
| | | | | 251/181 |
| 4,811,929 A | * | 3/1989 | Scaramucci | F16K 1/385 |
| | | | | 251/122 |
| 5,004,005 A | * | 4/1991 | Graves | F16K 5/0605 |
| | | | | 137/269.5 |
| 5,088,687 A | * | 2/1992 | Stender | F16K 5/0668 |
| | | | | 251/174 |
| 5,211,686 A | * | 5/1993 | Karlsen | F16K 5/0605 |
| | | | | 137/316 |
| 9,644,752 B2 | * | 5/2017 | Nabors | F16K 5/0605 |

FOREIGN PATENT DOCUMENTS

| | | | | |
|---|---|---|---|---|
| DE | 2202097 A1 | | 7/1973 | |
| FR | 2545571 A1 | | 11/1984 | |
| GB | 2016656 A | * | 9/1979 | F16K 5/0647 |

OTHER PUBLICATIONS

International Preliminary Report on Patentability for the International patent application PCT/US2018/018876 dated Sep. 12, 2019.
Extended Search Report issued in EP Application 18761485.4 dated Nov. 2, 2020 (6 pages).
Office Action received in the CN Application 2018800249754, dated Mar. 26, 2021 (14 pages).

* cited by examiner

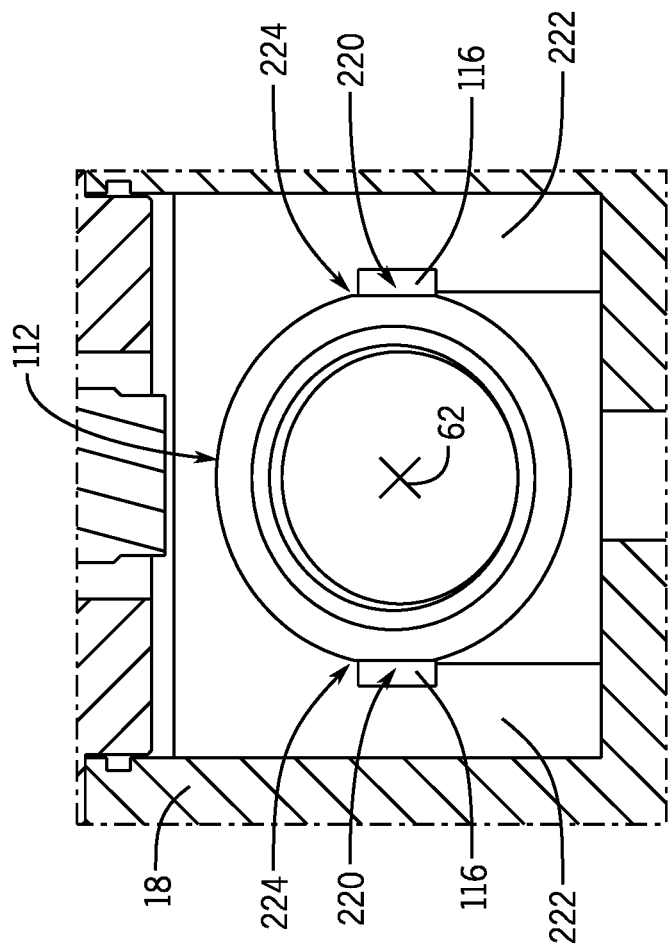
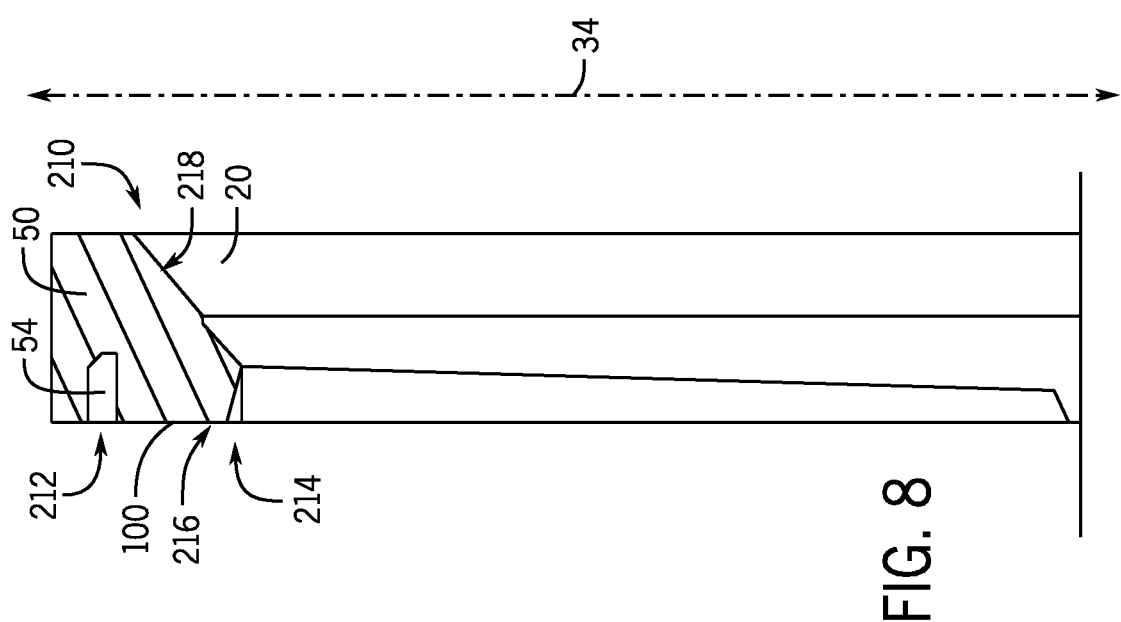

DOUBLE POSITIVE ISOLATION BALL VALVE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Ball valves are capable of controlling a flow through a conduit by using a sphere with a port or bore typically formed within the sphere. The valve is opened by rotating the sphere to position the port or bore in line with openings of a valve body. A flow may thus move from a first opening at a first end of the valve body, traverse the port or bore, and continue through a second opening at a second end of the valve. Likewise, the valve is closed by rotating the sphere so as to position the port or bore perpendicular to the openings of the valve body. Unfortunately, seal assemblies, like the seals between the body of the valve and the sphere or ball, in existing ball valves may utilize fluid pressure along the flow path to bias the seals to seat and block fluid leakage. Unfortunately, these seals relying on fluid pressure to seal may be susceptible to leakage and unreliable sealing in environments that include relatively high pressures and/or temperatures.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 8 is an expanded cross-sectional view of an embodiment of an interface between a seat of the valve assembly of FIG. 1 and the valve ball, in accordance with an aspect of the present disclosure;

FIG. 9 is a cross-sectional view of an embodiment of the cavity of the valve assembly of FIG. 1 illustrating an anti-rotation component, in accordance with an aspect of the present disclosure;

DETAILED DESCRIPTION OF SPECIFIC EMBODIMENTS

Figure 1:
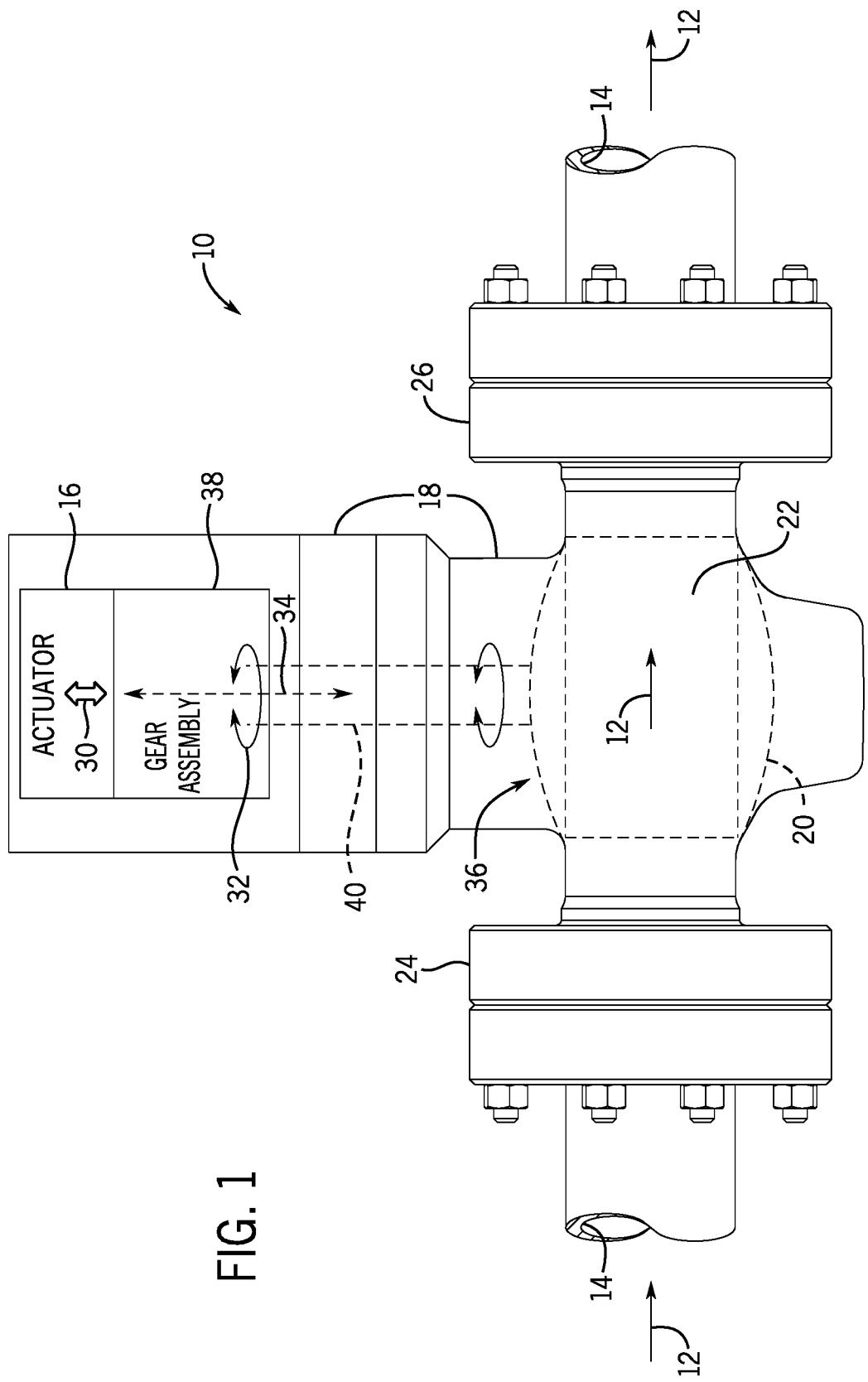
FIG. 1 is a schematic an embodiment of an enhanced valve assembly that may be used in a flow control system, in accordance with an aspect of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Flow control systems (e.g., mineral extraction systems, fluid processing systems, pressure control systems, etc.) may utilize seals for separating portions (e.g., conduits and/or other components) of the flow control system from one another. To achieve such seals without the disclosed embodiments, flow control systems include valve assemblies that have pressure-sealing seating surfaces as well as a cavity disposed between the seating surfaces that can be vented to verify isolation (e.g., block and bleed). For example, fluid pressure along a flow path of the flow control system may bias seats against a surface of the cavity to form a seal. In addition, the valve assembly may include multiple barriers, such that if fluid were to pass through a first barrier, a second barrier may maintain the seal (e.g., double isolation and bleed (DIB)). Enhanced sealability in a valve may be obtained by using mechanical seating (rather than pressure seating) in combination with block and bleed, and double isolation and bleed. When the three techniques are combined, the resulting seal may be a double positive isolation seal. Without the disclosed embodiments, valve assemblies of flow control systems may include two separate valves to form a double positive isolation seal. However, using two separate valves may be expensive and cause the valve assembly to have a relatively large footprint and/or weight.

Further, without the disclosed embodiments, double positive isolation seals may be formed using an expanding plug valve or a double expanding gate valve. Unfortunately, expanding plug valves may not be configured to withstand high pressure and high temperature environments because of deflection (e.g., inadvertent displacement of a valve member due to pressure forces) and/or use of non-metallic components (e.g., plastic may deform and/or otherwise not provide a sufficient seal above a threshold temperature). Additionally, while smaller than valve assemblies that include two separate valves, expanding plug valves and double expanding gate valves still have a relatively large footprint and/or weight. Systems that may benefit from double positive isolation seals (e.g., flow control systems) may have limited space and/or have weight limitations, such that reducing a size of double positive isolation valve assemblies is desirable. Accordingly, a valve assembly that may achieve a double positive isolation seal, withstand high temperatures and pressures, and include a reduced size may be particularly beneficial.

The embodiments of the present disclosure relate to a valve assembly that includes a valve ball (e.g., ball body), which may form a double positive isolation seal in a conduit configured to flow a fluid. For example, in some embodiments, the valve assembly may include a valve body that has surfaces (e.g., angled surfaces that form a tapered cavity) configured to receive a substantially spherical valve member (e.g., a valve ball or ball body). The cavity of the valve body may enable the substantially spherical valve member to move axially within the cavity to engage seats (e.g., seats that include an angled bore or angled seats), which may enhance a seal formed by the valve assembly when the substantially spherical valve member is in an engaged position. In other embodiments, the seats may be integral with the valve ball and/or the cavity of the valve body, such that the valve body may not include angled surfaces. In still further embodiments, the seats may be integral with the valve ball and/or the cavity of the valve body, and the valve body may include a conical seating surface. In any case, the valve ball may move axially within the cavity of the valve body to engage one or more seating surfaces (e.g., angled surfaces of the cavity, the seats, and/or another suitable component) and generate a wedge force against the valve ball and the valve body, which may enhance and/or create a seal. Additionally, the substantially spherical valve member (e.g., the valve ball) may rotate within the cavity to facilitate and/or block a fluid flow through the valve body. Utilizing the substantially spherical valve member in the valve assembly may reduce a footprint of the valve assembly while enabling the valve assembly to form a double positive isolation seal.

In some embodiments, the seats (e.g., separate components and/or components integral to the valve ball and/or the valve body) may include seals (e.g., annular seals) on both faces to enhance a seal of the valve assembly. For example, a metal wedge ring may be disposed between a first face (e.g., an outer face) of the seat and the valve body to form a first seal. Additionally, a second seal may form between a second face of the seat (e.g., an inner face) and the valve ball. In some embodiments, the valve ball may be configured to move in an axial direction, which may drive the seat, and thus the metal wedge ring, in the axial direction. As the metal wedge ring moves in the axial direction, the metal wedge ring may be directed toward the surfaces of the valve body, which may compress the metal wedge ring radially inward and against the surfaces of the valve body to form the seal. In other embodiments, the valve ball may move in the axial direction and engage another suitable seating surface (e.g., angled surfaces of the valve body) to generate a wedge force and create and/or enhance the seal. In any case, pressure acting on the seating surface from the valve ball as well as pressure acting on the valve ball itself (e.g., applied from fluid pressure in the valve body) may both contribute to establishing and maintaining the seal. In some embodiments, the valve ball may include a trunnion design (e.g., mechanical components in the valve body that support the valve ball in the valve body). In other embodiments, the valve ball may include a floating design (e.g., the valve ball may move upstream and/or downstream with respect to a flow of fluid through the valve body).

FIG. 1 is a diagrammatic illustration of a valve assembly 10 for controlling the flow 12 of a fluid through a flow path 14. The exemplary valve assembly 10 comprises an actuator 16 that is coupled to a valve body 18. As illustrated, the valve body 18 carries a valve ball 20. In an open configuration, a through bore 22 of the valve ball 20 is aligned with an inlet 24 and an outlet 26 of the valve assembly 10. This allows the flow 12 to pass through the valve body 18. The flow 12 can be interrupted by turning the valve ball 20 to place the through bore 22 perpendicular to the inlet 24 and the outlet 26. In other words, a quarter-turn (e.g., 90 degree turn) of the valve ball 20 transitions the valve assembly 10 between open and closed configurations.

To effectuate this quarter-turn, the actuator 16 provides a motive force through a drive source, such as an hydraulic actuator, an electric and linear motor, a pneumatic device, or a manual wheel, to name a few. In some embodiments, the actuator 16 may be configured to provide linear motion (e.g., as represented by arrow 30), rotational motion (e.g., as represented by arrow 32), or both linear and rotational motion. In other embodiments, the actuator 16 may include separate drives, where a first drive provides the linear motion 30 and a second drive provides the rotational motion 32. For example, the linear motion 30 may enable the valve ball 20 to move along an axis or in an axial direction 34 within a cavity 36 of the valve body 18. Such motion may provide the wedge force that enables the valve ball 20 to engage a seating surface, which may provide an enhanced seal formed by the valve assembly 10. Additionally, the rotational motion 32 may adjust a position of the through bore 22 of the valve ball 20 to facilitate and/or block the flow 12 of fluid through the valve assembly 10. As shown in the illustrated embodiment of FIG. 1, the actuator 16 may be positioned external to the valve body 18. However, in other embodiments, the actuator 16 may be disposed within the valve body 18. In any case, the actuator 16 may be configured to cause both the linear motion 30 and the rotational motion 32 of the valve ball 20 (e.g., the valve ball 20 may be raised and lowered in the axial direction 34 and rotated within the valve body 18).

In some embodiments, a gear assembly 38 may be coupled to the actuator 16 to switch between the linear motion 30 and the rotational motion 32. Specifically, the gear assembly 38 may enable the valve ball 20 to move in the axial direction 30 for a predetermined distance and/or time and then rotate the valve ball 20 in the circumferential direction 32 for a predetermined distance (e.g., a quarter-turn) and/or time. A valve stem 40 coupled to the valve ball 20 may be coupled to the output of the gear assembly 38. The valve stem 40 may be secured (e.g., flexibly secured) to the valve ball 20, and thus, torque applied to the stem 40 may be transferred to the valve ball 20 to drive movement of the valve ball 20. The valve assembly 10 may be used in an on/off manner to allow or restrict flow from upstream components to downstream components along the flow path 14. In other embodiments, the valve assembly 10 may be used to adjust, regulate, or choke the flow 12 of the fluid along the flow path 14, such that the flow 12 reaches a predetermined flow rate.

It should be appreciated that the valve 10 may be bi-directional, and the terms "inlet", "outlet," "upstream," and "downstream" are used for ease of reference and do not describe any specific directional limitation of the valve 10. Moreover, the use of the adjectival or adverbial modifiers "horizontal" and "vertical," "upwardly" and "downwardly," or "clockwise" and "counter-clockwise" are also used for ease of relative reference between the sets of terms and do not describe any specific directional limitation on the modified term.

Figure 2:
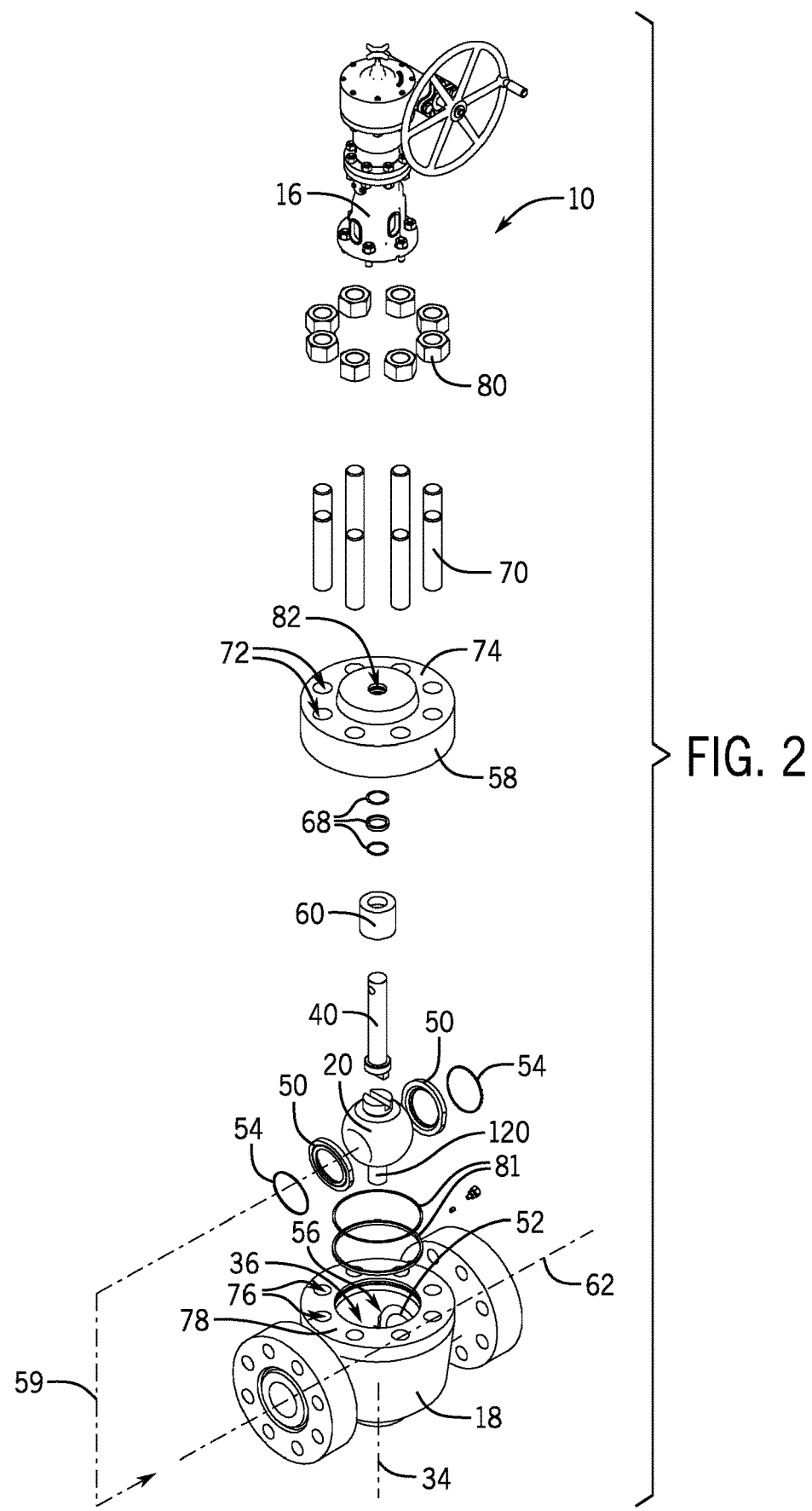
FIG. 2 is an exploded perspective view of an embodiment of the valve assembly of FIG. 1, in accordance with an aspect of the present disclosure.

FIG. 2 is an exploded perspective view of an improved valve assembly 10 that may form a double positive isolation seal. As shown in the illustrated embodiment of FIG. 2, the valve assembly 10 includes the valve body 18, which may include the cavity 36 (e.g., a cavity having tapered annular surfaces that forms one or more seating surfaces between the valve ball 20 and the valve body 18). For example, the cavity 36 may include conical seating surfaces. In some embodiments, the valve ball 20 may be substantially spherical and configured to be disposed in the cavity 36. In other embodiments, the valve ball 20 may include an ovoid shape, an oblong shape, an elongated curve shape, a pear shape, a bell shape, or another suitable shape that enables the valve ball 20 to be wedged into the cavity 36 and rotated within the cavity 36. In further embodiments, the valve ball 20 may have a constant radius (e.g., spherical) or a variable radius. For example, the radius of the valve ball 20 may vary by plus or minus 1, 2, 3, 4, 5, 10, 15, or 20 percent. In still further embodiments, the valve ball may include a curved exterior surface. For example, at least 70 percent, 75 percent, 80 percent, 85 percent, 90 percent, 95 percent, or 100 percent of the exterior surface of the valve ball 20 may be curved.

Additionally, seats 50 may be disposed in protrusions 52 (e.g., annular protrusions) in the cavity 36. The seats 50 may be utilized to enhance a seal formed by the valve assembly 10. In other embodiments, the seats 50 may be integrally formed with the valve ball 20 and/or the cavity 36 to form the one or more seating surfaces between the valve ball 20 and the valve body 18. In some embodiments, one or more sealing members 54 (e.g., wedge rings or annular seals) may be positioned between the seats 50 and the protrusion 52 of the cavity 36. Additionally, the sealing member 54 may include a wedge ring, an o-ring, plastic inserts, lip seals, and/or any other suitable component that enhances the seal in the valve assembly 10. The valve ball 20 may be coupled to the gear assembly 38 by the valve stem 40. In other embodiments, the valve assembly 10 may not include the gear assembly 38, such that the valve ball 20 is directly coupled to the actuator 16 by the valve stem 40.

As shown in the illustrated embodiment of FIG. 2, an opening 56 of the valve body 18 that provides access to the cavity 36 may be sealed with a cover 58 (e.g., a sealing flange or bonnet). While the illustrated embodiment of FIG. 2 shows the valve ball 20 being disposed in the cavity 36 through the opening 56 at a top portion of the valve body 18, it should be noted that in other embodiments, the valve ball 20 and other sealing components of the valve assembly 10 may be disposed in the valve body 18 through another opening of the valve body 18 (e.g., the inlet 24 and/or the outlet 26 on a side of the valve body 18 as shown by arrow 59). The valve stem 40 may include a bushing 60 (e.g., a nut) that may connect the valve stem 40 to the valve ball 20. Additionally, the cover 58 may include an opening 61 (e.g., cylindrical bore) that may provide support for the valve stem 40 in the cavity 36. In other words, the opening 61 in the cover 58 may block inadvertent movement of the valve stem 40 in a radial direction or axis 62. The valve stem 40 may be driven by the actuator 16 to rotate in the circumferential direction 32 (e.g., or circumferential axis) to rotate the valve ball 20. Additionally, the valve stem 40 may be driven by the actuator 16 to move in the axial direction 34 to engage (or disengage), the valve ball 20 with seating surfaces of the valve assembly 10. One or more seals 68 may further be disposed between the valve stem 40 and the cover 58 and/or between the opening 56 and the cover 58 to block a flow of fluid between the valve body 18 and the cover 58.

To couple the cover 58 to the valve body 18, one or more fasteners 70 (e.g., threaded rods) may be disposed in openings 72 along a perimeter 74 of the cover 58 and/or openings 76 along a perimeter 78 of the opening 56 of the valve body 18. The fasteners 70 may secure the cover 58 to the valve body 18 using one or more nuts 80 that may enable the fasteners 70 to tighten a connection between the cover 58 and the valve body 18 (e.g., tightening the nuts 80 may drive the fasteners 70 further into the openings 72 and/or 76). In some embodiments, one or more seals 81 may be disposed between the cover 58 and the valve body 18 to block a flow of the fluid between the cover 58 and the valve body 18.

Additionally, the actuator 16 may be disposed over the cover 58 and configured to extend into an opening 82 in the cover 58, such that the actuator 16 is coupled to the valve stem 40. In other embodiments, the valve stem 40 may extend through the opening 82 and couple to the actuator 16. In still further embodiments, the actuator 16 may be internal to the valve body 18 and coupled to the valve stem 40 within the valve body 18. In any case, the actuator 16 may be coupled to the valve stem 40 and be configured to direct the valve stem 40 in the axial direction 34 and/or the circumferential direction 32 to adjust a flow through the valve body 18 (e.g., the flow 12 from the inlet 24 to the outlet 26 or vice versa).

Figure 3:
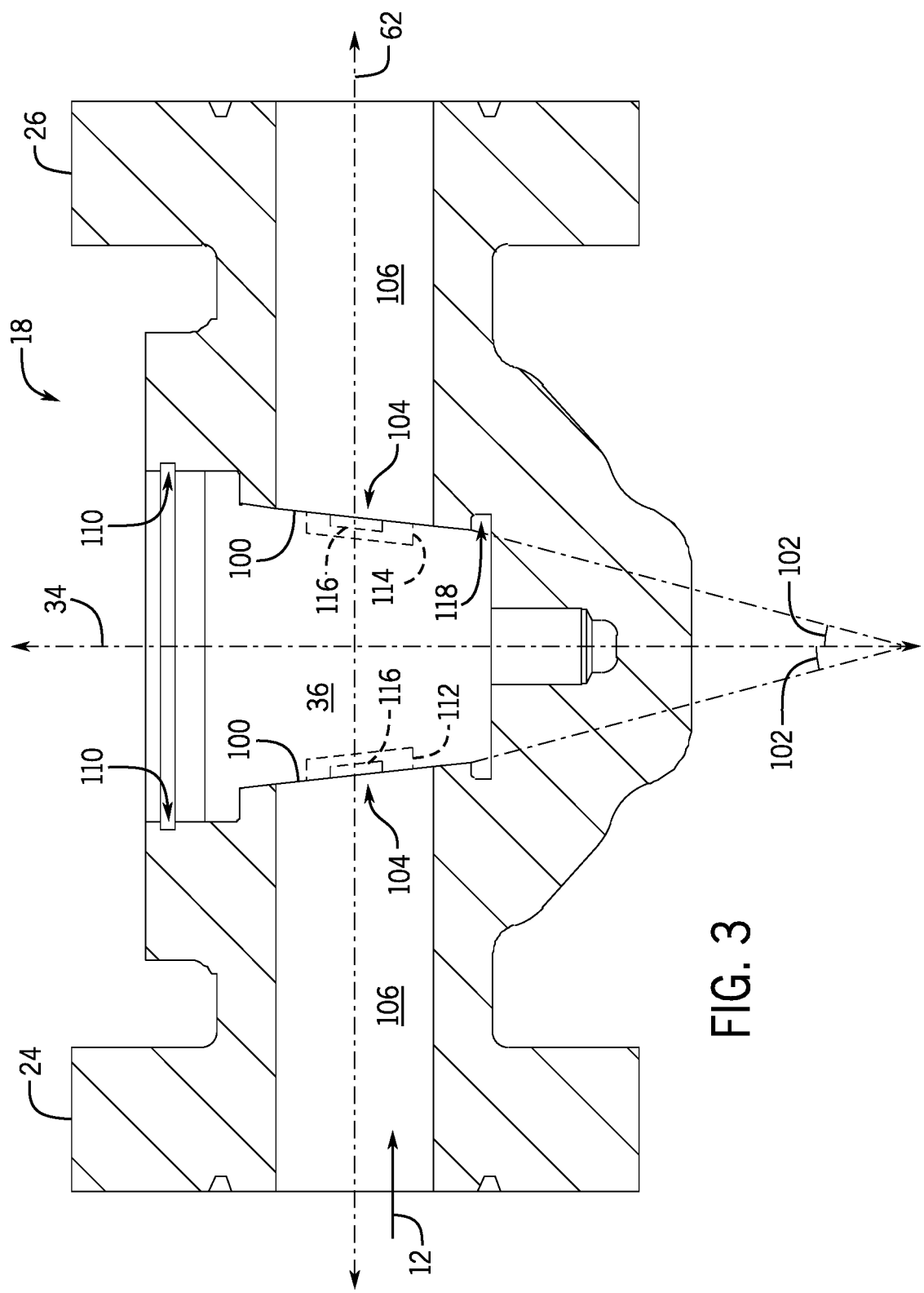
FIG. 3 is a cross-sectional view of an embodiment of the valve assembly of FIG. 1 illustrating a cavity in a valve body of the valve assembly, in accordance with an aspect of the present disclosure.

FIG. 3 is a cross-section of the valve body 18 illustrating the cavity 36. As shown in the illustrated embodiment of FIG. 3, the cavity 36 may include surfaces 100 (e.g., angled surfaces) that form an angle 102 with the axis 34. The angled surfaces 100 may include a tapered annular surface, such as a conical surface, or in other embodiments, may include one or more separate surfaces (e.g., non-continuous surfaces). In some embodiments, the angle 102 may be between 1 and 60 degrees, between 5 and 30 degrees, or between 7 and 20 degrees. In other embodiments, the angle 102 may be less than or equal to approximately (e.g., within 1 percent or within 5 percent of) 5 degrees, 10 degrees, 15 degrees, 20 degrees, 25 degrees, or 30 degrees. The surfaces 100 may each include openings 104 that are configured to enable the flow 12 through the valve body 18. The openings 104 may be fluidly coupled to the inlet 24 and the outlet 26 of the valve body 18 via a conduit 106 (e.g., an opening extending through the valve body 18). As shown in the illustrated embodiment of FIG. 3, the conduit 106 may extend along the axis 62 that may be substantially perpendicular to the axis 34. However, in other embodiments, the conduit 106 may not be substantially perpendicular to the axis 34 (see, e.g., FIG. 13).

Additionally, while the illustrated embodiment of FIG. 3 shows the cavity 36 having the angled surfaces 100, in some embodiments, the angle 102 may be generally 0 degrees (or 180 degrees) such that the surfaces 100 are not substantially angled with respect to the axis 34. In such embodiments, the seats 50 may be angled to form the one or more seating surfaces between the valve ball 20 and the valve body 18, such that the valve ball 20 may be wedged into the cavity 36 to form the seal. Additionally or alternatively, the seats 50 may be integrally formed with the valve ball 20 and/or the cavity 36 to form angled seating surfaces that enable the ball valve 20 to be wedged into the cavity 36 and form and/or enhance the seal. In still further embodiments, one of the angled surfaces 100 may be angled (e.g., the angle 102 is not substantially 0 degrees) and another of the angled surfaces 100 may not be angled (e.g., the angle 102 is substantially 0 degrees).

As shown in the illustrated embodiment of FIG. 3, the cavity 36 may include a recessed shoulder 110 (e.g., annular shoulder). In some embodiments, the recessed shoulder 110 may be configured to receive the one or more seals 81 (e.g., annular seals) that may block a flow of fluid between the valve body 18 and the cover 58. Additionally, the cavity 36 may include a first angled protrusion 112 (e.g., a first angled, annular protrusion) and a second angled protrusion 114 (e.g., a second angled, annular protrusion) that each may receive a seat 50. As discussed above, in other embodiments, the seats 50 may be integral to the valve body 20 and/or cavity 36 instead of separate components, as shown in FIG. 3 (e.g., the seats 50 may be welded onto the valve body 20 and/or the cavity 36 or otherwise coupled to the valve body 20 and/or the cavity 36 via a press fit bushing and/or another suitable fastener). To block rotational movement of the seats 50 about the axis 108, the first angled protrusion 112 and the second angled protrusion 114 (or the surfaces 100) may each include an anti-rotation component 116, such as a protrusion from the first angled protrusion 112 and the second angled protrusion 114 that engages with a corresponding slot in the seats 50 and/or a pin that protrudes from the first angled protrusion 112 and the second angled protrusion 114. The anti-rotation component 116 may enable movement of the seats 50 in the axial direction 34, but block rotational movement of the seats about the axis 108.

In certain embodiments, the seats 50 may also be angled such that the flow 12 through the valve body 18 is substantially uninterrupted. For example, the seats 50 may be machined to include the angle 102, such that the seats 50 may be flush with the cavity 36. Accordingly, the seats 50 may not protrude through the openings 104 of the cavity 36. In some embodiments, it may be desirable for the seats 50 to be as uniform with each other to ensure uniform expansion of the seats 50 when pressure is applied in multiple directions. In other embodiments, the seats 50 may not be angled (e.g., machined to include the angle 102). Rather, the seats 50 may be machined onto the valve ball 20 and/or the cavity 36 of the valve body 18, such that the seats 50 are integral to the valve ball 20 and/or the cavity 36.

Additionally, the cavity 36 may include an annular recess 118 that may be configured to receive an axial guide component 120 coupled to the valve ball 20 (see, e.g., FIG. 2). Accordingly, the valve ball 20 may move in the axial direction 34 and rotate in the circumferential direction 32 without becoming misaligned with respect to the cavity 36. When the valve ball 20 is disposed in the cavity 36, a vent chamber may be configured to form in the annular recess 118 when the valve ball 20 is in a vent position (see, e.g., FIG. 4). Accordingly, the seal between the inlet 24 and the outlet 26 may be tested (e.g., monitored) to detect leaks.

Figure 4:
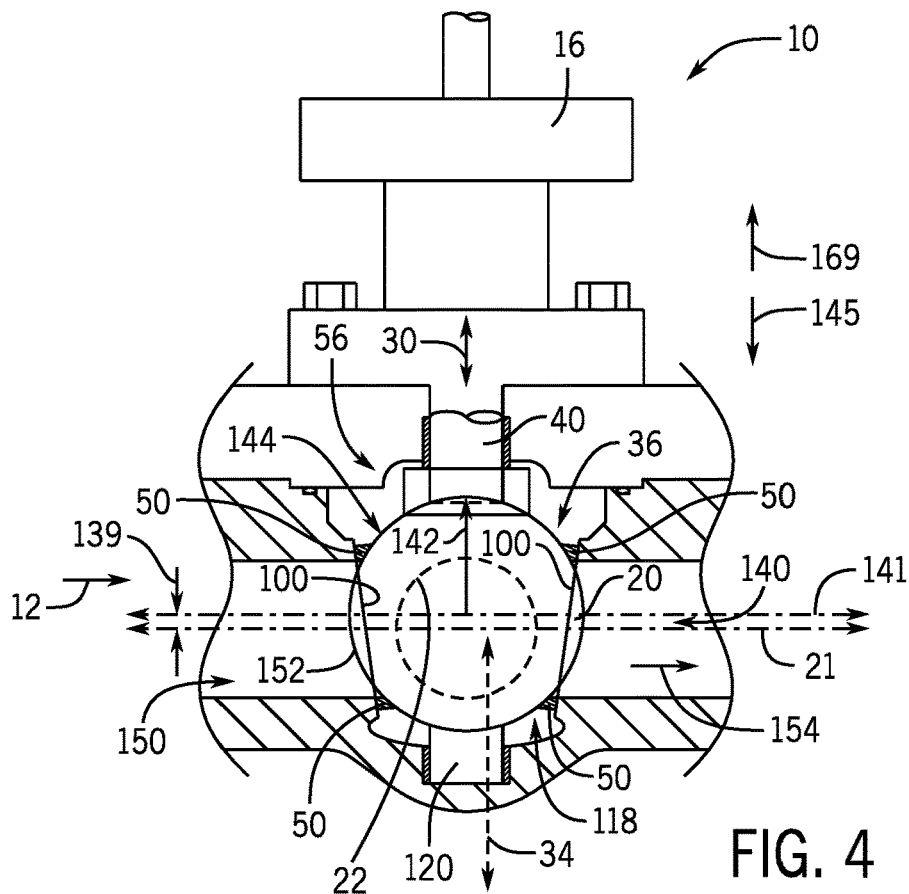
FIG. 4 is a cross-sectional view of an embodiment of the valve assembly of FIG. 1 illustrating a valve ball in a closed position, in accordance with an aspect of the present disclosure.

FIG. 4 is a cross-section view of the valve assembly 10 with the valve ball 20 disposed in the cavity 36 of the valve body 18. More specifically, FIG. 4 shows the valve ball 20 in a closed position 140. As shown in the illustrated embodiment, a central axis 21 of the bore 22 of the valve ball 20 may be offset from a centerline 141 of the valve ball 20 by an offset distance 139. As shown in the illustrated embodiment of FIG. 4, the bore 22 of the valve ball 20 may be positioned closer to a first side (e.g., bottom side) of the valve ball 20 than a second side (e.g., top side) of the valve ball 20. In some embodiments, the offset of the bore 22 may be defined by $R \sin(\alpha)$, where R is a radius 142 of the valve ball 20 and $\alpha$ is the angle 102 of the seats 50. In other embodiments, the offset of the bore 22 may be defined using another suitable technique. In any case, offsetting the bore 22 of the valve ball 20 may facilitate manufacturing of the valve assembly 10. For example, offsetting the bore 22 may enable the seats 50 to be manufactured symmetrically with one another, which may reduce costs of the valve assembly 10. Offsetting the bore 22 enables the seats 50 (e.g., symmetrical seats) to deflect in a uniform manner, thereby enhancing the seal. Additionally, the bore 22 may extend linearly through the valve ball 20, and thus, may be machined without angled surfaces and/or non-linear surfaces within in the bore 22.

As shown in the illustrated embodiment of FIG. 4, the valve body 18 may include the recess 118 (e.g., an annular recess) positioned below the valve ball 20 with respect to the axial direction 34. The recess 118 may be utilized as a vent cavity to determine a status of the seal formed by the valve assembly 10 and/or a condition of the valve assembly 10. For example, when the valve ball 20 is in the closed position 140, the recess 118 may be vented (e.g., via a vent port or an exhaust port). If fluid continues to flow from the recess 118 beyond a predetermined amount (e.g., an amount consistent with a volume of the recess 118), then an operator may determine that a leak is present in the valve assembly 10 and/or that a seal has formed improperly.

To position the valve ball 20 in the closed position 140, the actuator 16 may drive the valve ball 20 in the axial direction 34 (e.g., as shown by the arrow 30). In some embodiments, because the seats 50 are disposed in the cavity 36 at the angle 102 (e.g., due to the surfaces 100 having the angle 102), the axial motion 34 wedges the valve ball 20 between the seats 50 and drives the seats 50 in the axial direction 34 into and/or along the first angled protrusion 112 and the second angled protrusion 114. Additionally, because the valve ball 20 may be substantially spherical (and thus symmetrical), the seats 50 align with a surface 144 of the valve ball 20 and the surfaces 100 of the cavity 36. In other embodiments, the seats 50 may be integral with the valve ball 20 and/or the cavity 36. Accordingly, when the valve ball 20 is driven in the axial direction 34, the valve ball 20 may wedge into the surfaces 100 of the cavity 36, as shown by arrow 145. In any case, the valve ball 20 engages with a seating surface (e.g., the seats 50, the angled surfaces 100, a combination thereof, or another suitable surface) as the ball valve 20 moves in the axial direction 34 to form and/or enhance the seal. Some degree of freedom may be included in the connection between the valve ball 20 and the valve stem 40 to allow axial alignment of the valve ball 20 with the surfaces 100 to allow for manufacturing and/or engineering tolerances. Attachment of the valve stem 40 to the valve ball 20 is discussed in more detail herein with reference to FIGS. 10-12.

In some embodiments, as the valve ball 20 moves in the axial direction 34 (e.g., as shown by arrow 30), the valve ball 20 is wedged into the cavity 36 (e.g., the surfaces 100 of the cavity 36), thereby driving the seats 50, and thus the sealing member 54, against the first angled protrusion 112 and the second angled protrusion 114 to seal the cavity 36 from the flow path 14. In other embodiments, the seats 50 may be driven (e.g., wedged) against the surfaces 100 to form the seal (e.g., when the seats 50 are integral to the valve ball 20 and/or the cavity 36). In any case, the wedging action of the valve ball 20 may initiate the seal between the cavity 36 and the flow path 14 by compressing the sealing member 54 (e.g., the wedge ring) and generating a contact stress between the valve ball 20 and the surfaces 100 of the cavity 36. Accordingly, as pressure is applied to the valve ball 20 (e.g., as the actuator 16 drives the valve ball 20 in the axial direction), the valve assembly 10 may seal.

Additionally, pressure in an upstream conduit 150 of the valve assembly 10 may be applied to an upstream side 152 of the valve ball 20 to drive the valve ball 20 downstream (e.g., as shown by arrow 154) toward one of the openings 104 of the cavity 36. Thus, fluid pressure in the valve body 18 may further seal the cavity 36 from the flow path 14. For example, fluid pressure applied to the upstream side 152 of the valve ball 20 may increase a force applied to the sealing member 54, thereby enhancing the seal between the valve ball 20 and the surfaces 100 and/or the seats 50.

In some embodiments, the seal between the valve ball 20 and the seats 50 may be a metal to metal seal (e.g., when the seats 50 include a metallic material). In other embodiments, the seal between the valve ball 20 and the seats 50 may be a metal to soft material seal (e.g., when the seats 50 include a soft metal material, a polymeric material, or other suitable non-metallic material). Further, the seal between the seats 50 and the valve body 18 may be formed by the sealing member 54 as the sealing member 54 is wedged into the first angled protrusion 112 and/or the second angled protrusion 114 or otherwise against the surfaces 100.

Figure 5:
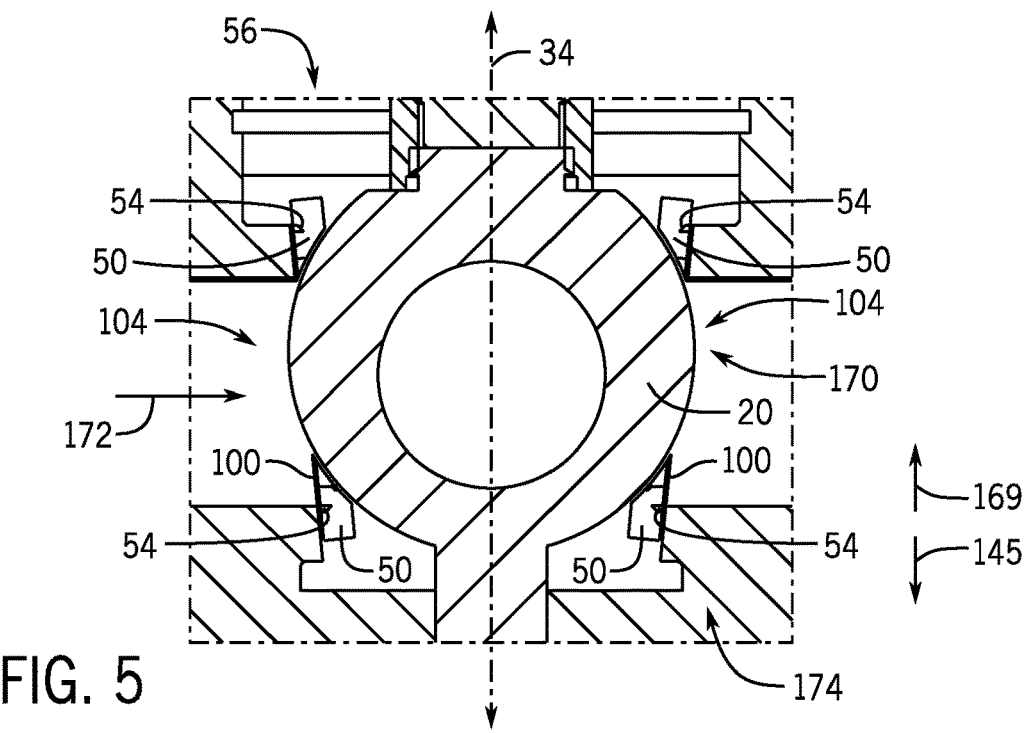
FIG. 5 is a cross-sectional view of an embodiment of the valve assembly of FIG. 1 illustrating the valve ball in an intermediate closed position, in accordance with an aspect of the present disclosure.

As discussed above, a position of the valve ball 20 may be adjusted by the actuator 16. For example, to open the valve assembly 10, the actuator 16 may lift the valve ball 20 and/or the seats 50 toward the opening 56 of the cavity 36, as shown in FIG. 5. For example, the actuator 16 may controllably move the valve ball 20 in the axial direction 34, as shown by arrow 169, by applying a physical force to the valve ball 20 via the valve stem 40. In some embodiments, the actuator 16 may move the valve ball 20 in the axial direction 34 without the use of a biasing member (e.g., a spring) and without rotation of the valve ball 20. In any case, as the valve ball 20 and/or the seats 50 move in the axial direction 34 (e.g., toward the opening 56 of the valve body 18), the valve ball 20 may become disengaged from the surfaces 100 of the cavity 36 (e.g., unseated), as shown by the arrow 169. The sealing member 54 may release pressure (e.g., decompress and/or expand) relatively quickly, such that the valve ball 20, the seats 50, and/or the surfaces 100 are disengaged from one another to remove the seal.

In some embodiments (e.g., for a floating design of the valve assembly 10), when the valve ball 20 and the seats 50 are in a lifted position 170, fluid pressure 172 may push the valve ball 20 toward a corresponding opening 104 (e.g., the opening 104 on an opposite side 174 of the valve ball 20 to which the fluid pressure is applied). In other embodiments, (e.g., the trunnion design of the valve assembly 10), when the valve ball 20 and the seats are in the lifted position 170, the valve ball 20 may be supported by one or more structural features in the cavity 36 and the fluid pressure 172 may not move the valve ball 20. Further, in some embodiments, the actuator 16 may lift and turn the valve ball 20 separately (e.g., the valve ball 20 is lifted and then subsequently rotated, or vice versa), which may reduce friction that may occur between the valve ball 20 and the seats 50. For example, a gap 175 may form between the valve ball 20, the surfaces 100, and/or and the seats 50 when the valve ball 20 is lifted in the axial direction 34, as shown by the arrow 169. However, in other embodiments, the actuator 16 may turn and lift the valve ball 20 simultaneously and/or turn the valve ball 20 before lifting.

Figure 6:
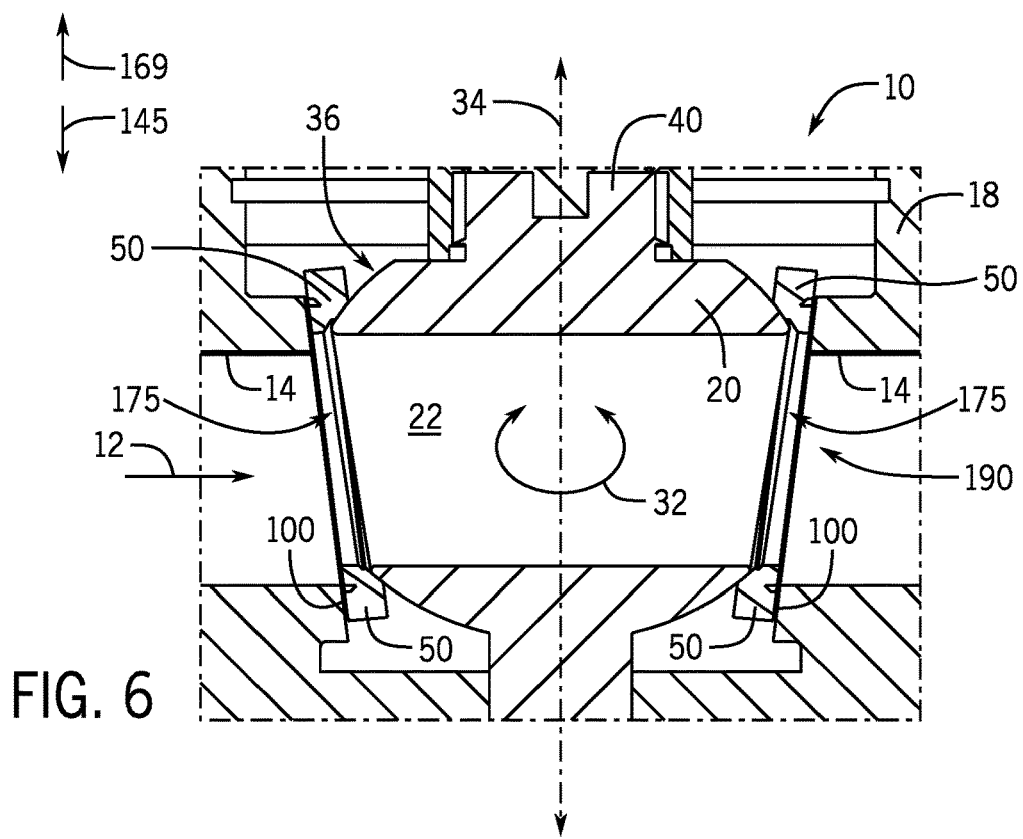
FIG. 6 is a cross-sectional view of an embodiment of the valve assembly of FIG. 1 illustrating the valve ball in an intermediate open position, in accordance with an aspect of the present disclosure.
Figure 7:
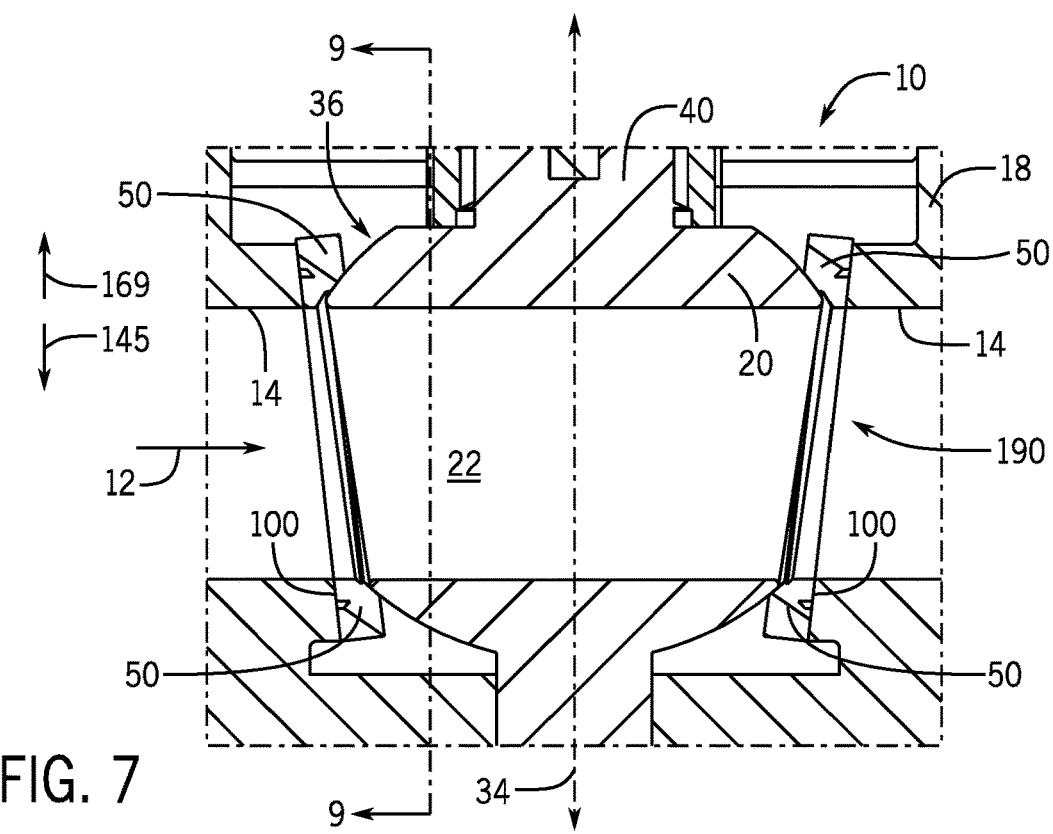
FIG. 7 is a cross-sectional view of an embodiment of the valve assembly of FIG. 1 illustrating the valve ball in an open position, in accordance with an aspect of the present disclosure.

Once the valve ball 20 and the seats 50 are lifted into the lifted position 170 (e.g., the valve ball 20 does not apply pressure to the seats 50 and/or the sealing member 54), the valve ball 20 may be turned (e.g., via the actuator) in the circumferential direction 32 to an open position 190, as shown in FIG. 6. Additionally, the valve ball 20 may then be directed in the axial direction 34 (e.g., as shown by the arrow 145) to reseat against the seating surface (e.g., apply pressure to the seats 50, the surfaces 100, and/or the sealing member 54), as shown in FIG. 7. As discussed above, the seats 50 may provide an enhanced seal between the valve ball 20 and the surfaces 100 of the cavity 36. As shown in the illustrated embodiments of FIGS. 6 and 7, the bore 22 of the valve ball 20 is aligned with the flow path 14, such that the fluid 12 may flow through the valve assembly 10.

Similarly, the valve assembly 10 may be closed by the actuator 16 in substantially the same manner as that discussed with respect to FIGS. 4-7. For example, from the open position 190, the actuator 16 may lift the valve ball 20 and/or the seats 50 in the axial direction 34, as shown by the arrow 169. As the valve ball 20 and/or the seats 50 move in the axial direction 34 (e.g., toward the opening 56 of the valve body 18), the valve ball 20 and the seats 50 become disengaged (e.g., no pressure is applied) from the surfaces 100 of the cavity 36, which may form the gaps 175. Once the valve ball 20 and the seats 50 are lifted (e.g., the valve ball 20 does not apply pressure to the seats and/or the sealing member 54), the valve ball 20 may be turned to the closed position 140 (e.g., via the actuator 16) and reseated against the seating surface (e.g., apply pressure to the seats 50, the surfaces 100, and/or the sealing member 54). It should be noted that a connection between the valve stem 40 and the valve ball 20 may be relatively flexible to account for manufacturing and/or engineering tolerances of the actuator 16 and the valve assembly 10 (see, e.g., FIGS. 10-12).

FIG. 8 is an expanded cross sectional view of an interface 210 between the valve ball 20, the seats 50, and the sealing member 54. As shown in the illustrated embodiment of FIG. 8, the seats 50 may include a groove 212 (e.g., an annular groove) that may receive the sealing member 54. When the seats 50 are driven in the axial direction 34 (e.g., as shown by the arrow 145) by the valve ball 20, the sealing member 54 may compress within the seats 50. Thus, when the seats 50 are driven into the first angled protrusion 112 and the second angled protrusion 114 (or otherwise against the surfaces 100), the sealing member 54 may bias the seats 50 toward edges 214 of the openings 117 of the cavity 36. Therefore, the seats 50 may form a seal between the valve ball 20 and the surfaces 100 of the cavity 36.

In some embodiments, the seats 50 may be designed with a bias, such that pressure applied to the seats 50 drives the seats 50 further into the first angled protrusion 112 and/or the second angled protrusion 114 to seal the valve assembly 10. For a downstream seal (e.g., downstream with respect to the flow 12), fluid pressure may drive the valve ball 20 toward the seat (e.g., for a floating design) and the seal may be enhanced (e.g., tightened) as the fluid pressure increases. Additionally, for an upstream seal (e.g., upstream with respect to the flow 12), fluid pressure may be applied to a larger area on an outer face 216 of the mechanical seat 50 than an inner face 218 of the seat 50. The bias of the seats 50 may compensate for body deflections that can act opposite of the wedging.

FIG. 9 is a cross-section of the valve body 18 that shows the anti-rotation component 116 in the first angled protrusion 112 (and/or otherwise disposed in one of the surfaces 100) taken along 9-9 of FIG. 7. As discussed above, the anti-rotation component 116 may be protrusions 220 (e.g., one or more pins) that extend from a surface 222 of the first angled protrusion 112 (e.g., extends radially outward from the surfaces 100). Additionally, the seats 50 may include corresponding slots 224 that may receive the protrusions 220. When the valve ball 20 is directed in the axial direction 34 and/or rotated in the circumferential direction 32, the seats 50 may be blocked from rotating about the axis 62 within the first angled protrusion 112 (and/or against the surface 100) because of the protrusions 220 and the slots 224. In some embodiments, the seats 50 may provide an enhanced seal when positioned in a predetermined orientation. Accordingly, the protrusions 220 may be utilized to align bores of the seats 50 with the inlet 24 and the outlet 26 of the valve body 18 to enhance the seal of the valve assembly 10.

Figure 10:
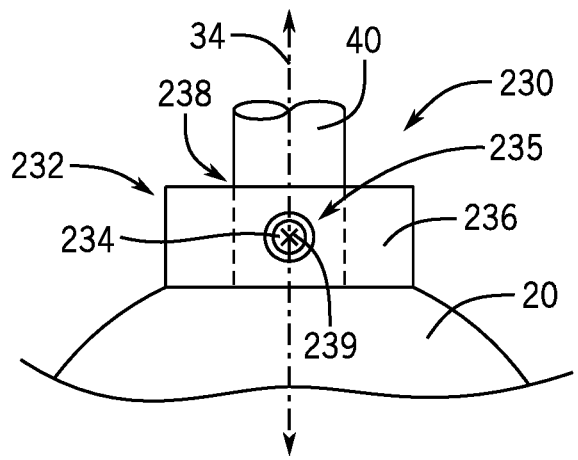
FIG. 10 is a schematic of an embodiment of a connection between the valve ball and a valve stem of the valve assembly of FIG. 1, in accordance with an aspect of the present disclosure.
Figure 11:
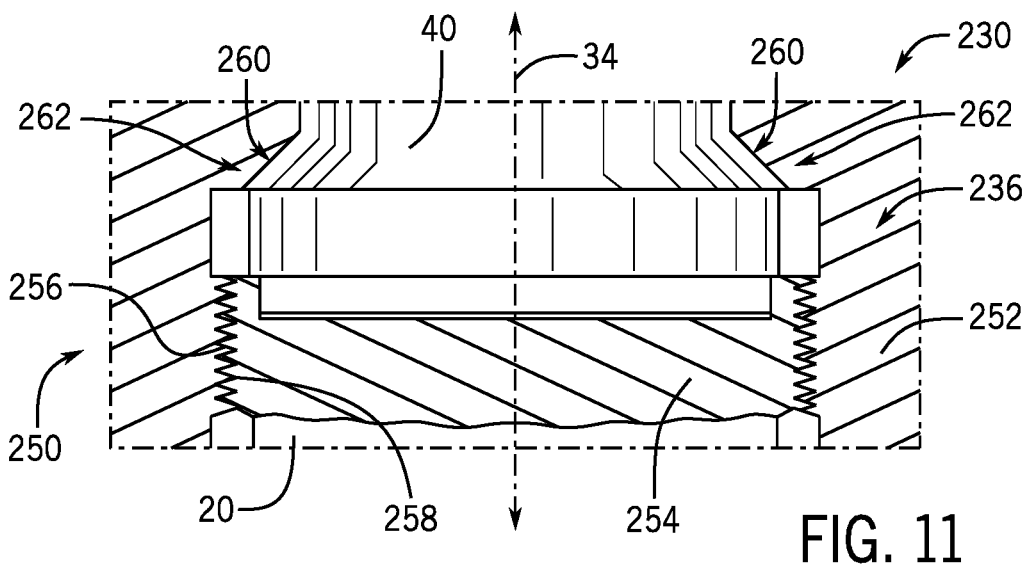
FIG. 11 is a schematic of an embodiment of a connection between the valve ball and a valve stem of the valve assembly of FIG. 1, in accordance with an aspect of the present disclosure.
Figure 12:
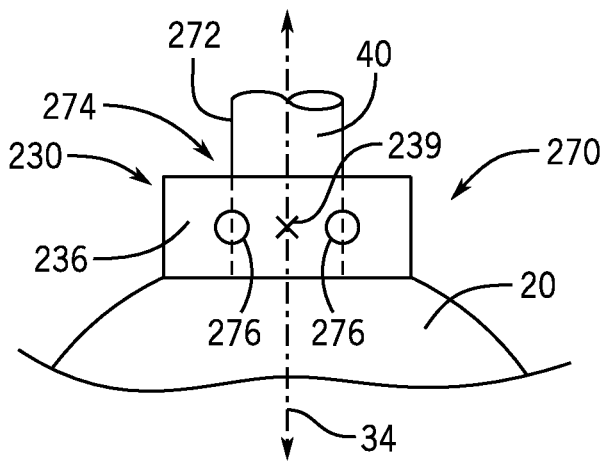
FIG. 12 is a schematic of an embodiment of a connection between the valve ball and a valve stem of the valve assembly of FIG. 1, in accordance with an aspect of the present disclosure.

As discussed above, a connection between the valve ball 20 and the valve stem 40 may be flexible to account for manufacturing and/or engineering tolerances of the cavity 36. FIGS. 10-12 are cross sectional views of embodiments of the connection 230 between the valve stem 40 and the valve ball 20. For example, FIG. 10 is a cross-sectional view of the connection 230 between the valve stem 40 and the valve ball 20 having a pin connection 232. For example, the valve stem 40 may be coupled to the valve ball 20 via a pin 234 that extends through a bore 235 of the valve stem 40. The valve ball 20 may include a coupling portion 236 that may extend from the valve ball 20 and include an opening 238 (e.g., a threaded opening) configured to receive the pin 234. Accordingly, an axis 239 defining the opening 238 and/or the bore 235 may be substantially crosswise (e.g., perpendicular) to the axial direction 34. In some embodiments, the coupling portion 236 of the valve ball 20 may extend outside of the cavity 36, such that the pin connection 232 is isolated from the fluid flowing through the valve assembly 10.

Additionally, FIG. 11 is a cross-sectional view of another embodiment of the connection 230 between the valve stem 40 and the valve ball 20 having a threaded connection 250. As shown in the illustrated embodiment, the coupling portion 236 of the valve ball 20 may include a threaded opening 252 (e.g., female threaded opening) that is configured to receive a threaded member 254 of the valve stem 40 (e.g., male threaded member). Accordingly, to couple the valve ball 20 to the valve stem 40, the threaded member 254 of the valve stem 40 may be inserted into the threaded opening 252 and turned to tighten threads 256 of the threaded opening 252 and threads 258 of the threaded member 254 to one another. In some embodiments, the coupling portion 236 of the valve ball 20 may extend out of the cavity 36, such that the threaded connection 250 between the valve ball 20 and the valve stem 40 is isolated from the fluid flowing through the valve body 18.

The threaded connection 250 may provide a degree of freedom within the cavity 36 when the valve ball 20 is in the closed position 140 and/or the open position 190. Unfortunately, when the valve assembly 10 is actuated (e.g., moved from the closed position and/or the open position 190 to the lifted position 170), this degree of freedom may enable the fluid pressure 172 to direct the valve ball 20 downstream, which may lead to drag on the seats 50 and/or high torque on the stem 40. Accordingly, in some embodiments, the valve stem 40 of the threaded connection 250 may include a tapered surface 260 that may be received in a corresponding tapered groove 262 of the coupling portion 236. The tapered surface 260 and corresponding tapered groove 262 may reduce the degree of freedom when the valve ball 20 is directed toward the lifted position 170 because the fluid pressure 172 applied to the valve ball 20 may be transferred to the coupling portion 236 (e.g., by the tapered surface 260) and/or the axial guide component 120 (not shown).

Further, FIG. 12 is a cross sectional view of another embodiment of the connection 230 between the valve ball 20 and the valve stem 40 having a shaft and pin connection 270. As shown in the illustrated embodiment, the valve stem 40 may include a shaft portion 272 that is configured to be disposed in an opening 274 (e.g., an annular recess) of the coupling portion 236 of the valve ball 20. Additionally, one or more fasteners 276 may be disposed into the shaft portion 272 (e.g., the fasteners 276 engage side walls 277 of the shaft portion 272) and/or the coupling portion 236 of the valve ball 20 to secure the shaft portion 272 of the valve member 40 into the coupling portion 236 of the valve ball 20. For example, the illustrated embodiment of FIG. 12 shows the shaft and pin connection 270 having two of the fasteners 276. In other embodiments, the shaft and pin connection 270 may include one fastener 276 or more than two fasteners 276 (e.g., three, four, five, six, seven, eight, nine, ten, or more of the fasteners 276). In any case, the fasteners 276 may extend through the coupling portion 236 along the axis 239, which is crosswise (e.g., substantially perpendicular to) the axial direction 34.

In other embodiments, the valve stem 40 may be coupled to the valve ball 20 using another suitable technique. For example, the valve stem 40 may include a keyed head portion that is configured to mate with the connection portion 236 of the valve ball 20. Further, the keyed head portion may be secured to the connection portion by a threaded cap (e.g., a set screw).

Figure 13:
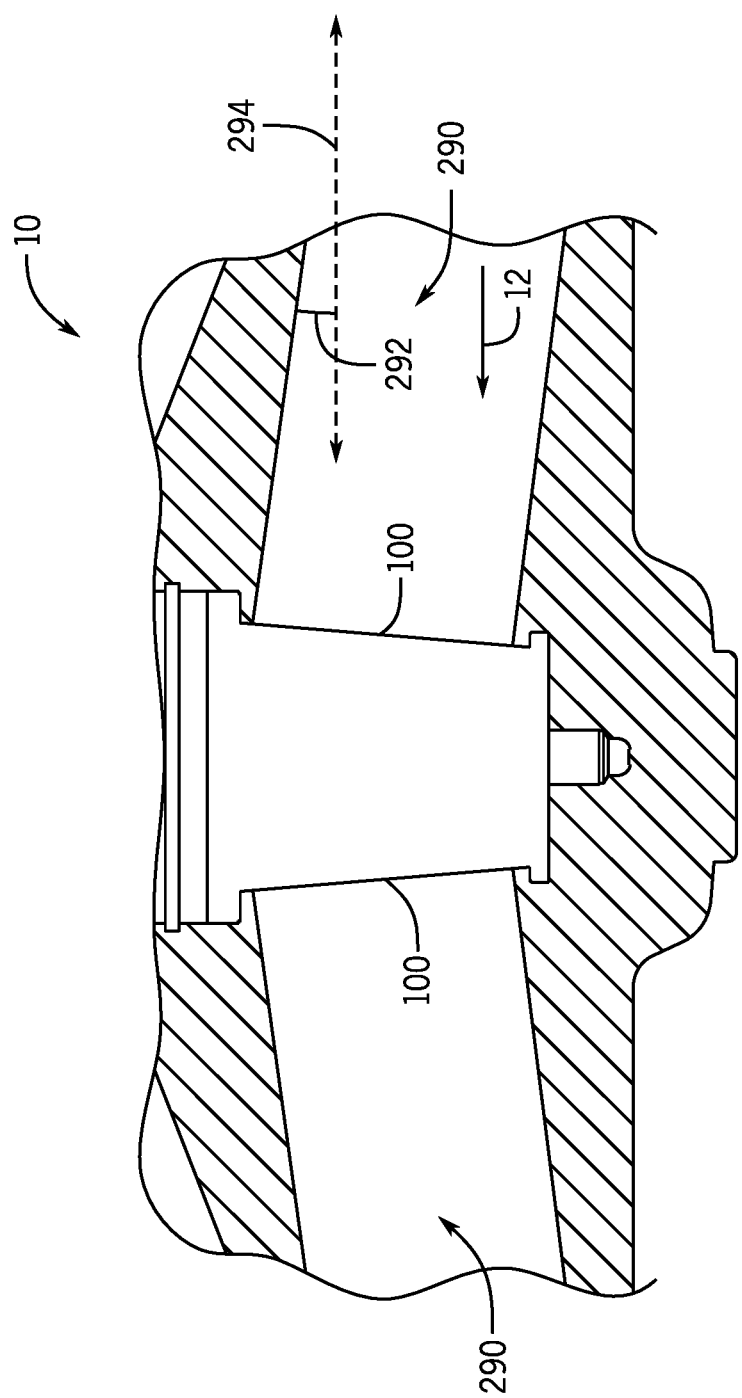
FIG. 13 is a cross sectional view of an embodiment of the valve assembly of FIG. 1 illustrating the valve body having angled passages, in accordance with an aspect of the present disclosure.

Another embodiment of the valve assembly 10 having angled flow passages 290 is shown in FIG. 13. For example, the angled flow passages 290 may form an angle 292 with an axis 294 that is substantially parallel to a direction of the flow 12. Such an embodiment may enable the seats 50 to be constructed without having an offset (e.g., the bore 22 through the valve ball 20 may still be offset though). Additionally, the angled flow passages 290 may facilitate machining of the valve assembly 10 (e.g., the cavity 36). For example, forming the angled flow passages 290 may automatically form angles within the surfaces 100 of the cavity 36, such that the angles of the surfaces 100 may not have to be generated independent of the flow passages 290.

While the presently disclosed embodiments may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the present disclosure as defined by the following appended claims.

The invention claimed is:

1. A valve assembly, comprising:
a valve body comprising a cavity;
one or more seats disposed within the cavity, wherein the one or more seats comprise one or more seating surfaces;
a ball body disposed within the valve body and configured to engage the one or more seats to form a seal, wherein the ball body comprises a valve stem extending along a first central axis of the cavity, and each seat of the one or more seats is angled relative to the first central axis of the cavity; and
a single actuator coupled to the valve stem, wherein the single actuator is configured to move the ball body in a first axial direction along the first central axis of the cavity to wedge the ball body against the one or more seats to form the seal, wherein the single actuator is configured to move the ball body in a second axial direction along the first central axis to unseat the ball body from the one or more seats, wherein the single actuator is configured to rotate the ball body about the first central axis between an open position and a closed position when the ball body is unseated from the one or more seats, and wherein the single actuator is configured to move in the first axial direction and the second axial direction without rotating the ball body about the first central axis.

2. The valve assembly of claim 1, wherein the ball body comprises a bore that is configured to facilitate a fluid flow through the valve body when the bore is aligned with upstream and downstream conduits of the valve body, wherein the bore extends linearly through an entirety of the ball body, wherein the bore, the upstream conduit, and the downstream conduit are aligned with an equal diameter.

3. The valve assembly of claim 1, wherein a second central axis of the bore of the ball body is offset from a third central axis of the ball body.

4. The valve assembly of claim 3, wherein each seat of the one or more seats is symmetric about a seat axis of the respective seat, each seat of the one or more seats is removably disposed in the cavity of the valve body, and each seating surface of the one or more seating surfaces extends about the seat axis of the respective seat of the one or more seats.

5. The valve assembly of claim 3, wherein the second central axis of the bore of the ball body is offset from the third central axis of the ball body by a distance, wherein the distance is based on a radius of the ball body and an angle of the one or more seating surfaces with respect to the first central axis.

6. The valve assembly of claim 5, wherein the distance is defined by an equation $R\sin(\alpha)$, wherein "R" represents the radius of the ball body, and wherein "$\alpha$" represents the angle of the one or more seating surfaces with respect to the first central axis.

7. The valve assembly of claim 1, comprising a plurality of anti-rotation components between the valve body and the one or more seats, wherein the plurality of anti-rotation components is configured to block rotation of the one or more seats within the valve body.

8. The valve assembly of claim 7, wherein the plurality of anti-rotation components comprises a plurality of protrusions that interface with a plurality of slots.

9. The valve assembly of claim 1, wherein the ball body comprises an axial guide extending along the first central axis of the cavity, the valve stem extends from a first side of the ball body, the axial guide extends from an opposite second side of the ball body, the axial guide is disposed within a recess of the valve body, the valve body comprises an annular recess in an interior sidewall of the cavity, and the annular recess extends around the axial guide.

10. The valve assembly of claim 1, comprising a seal disposed within a groove of each seat of the one or more seats, such that the seal is positioned between the valve body and each seat of the one or more seats.

11. A valve assembly, comprising:
a valve body comprising a cavity having angled surfaces;
a substantially spherical ball body disposed within the valve body, wherein the substantially spherical ball body comprises a bore having a first central axis offset from a second central axis of the substantially spherical ball body;
an actuator configured to drive the ball body in a first axial direction along a third central axis of the cavity, to move the ball body in a second axial direction along the third central axis to unseat the ball body, and to rotate the ball body about the third central axis, wherein the actuator is configured to drive the ball body in the first axial direction and to move the ball body in the second axial direction without rotating the ball body about the third central axis; and
one or more seats disposed between the ball body and the valve body, wherein the one or more seats are configured to move along the angled surfaces as the actuator drives the ball body in the axial direction, wherein a seat of the one or more seats comprises a first groove configured to receive a first protrusion extending from the angled surfaces of the valve body and a second groove configured to receive a second protrusion extending from the angled surfaces of the valve body, wherein the first groove and the second groove are positioned on opposite sides of the seat of the one or more seats, and wherein the first groove and the first protrusion and the second groove and the second protrusion are configured to block rotation of the seat with respect to the angled surfaces of the valve body.

12. The valve assembly of claim 11, wherein the angled surfaces of the valve body form an angle with the third central axis of the cavity.

13. The valve assembly of claim 12, wherein the first central axis of the bore of the ball body is offset from the second central axis of the ball body based on a radius of the ball body and the angle of the angled surfaces with respect to the central axis.

14. The valve assembly of claim 12, wherein the one or more seats are angled with respect to the third central axis at the angle.

15. A valve assembly, comprising:
a valve body comprising a cavity;
one or more seats disposed within the cavity, wherein the one or more seats comprise one or more seating surfaces;
a ball body disposed within the valve body, wherein the ball body comprises a bore having a first central axis offset from a second central axis of the ball body by a distance, wherein the bore extends linearly through an entirety of the ball body, wherein the distance is based on a radius of the ball body and an angle of the one or more seating surfaces with respect to a third central axis of rotation and axial movement of the ball body in the cavity, wherein the distance is defined by an equation $R\sin(\alpha)$, wherein "R" represents the radius of the ball body, and wherein "$\alpha$" represents the angle of the one or more seating surfaces with respect to the third central axis; and an actuator configured to move the ball body in a first axial direction along the third central axis to wedge the ball body against the one or more seats to form a seal, to move the ball body in a second axial direction along the third central axis to unseat the ball body from the one or more seats, and to rotate the ball body about the third central axis when the ball body is unseated from the one or more seats, wherein the actuator is configured to move the ball body in the first axial direction and to move the ball body in the second axial direction without rotating the ball body about the third central axis, and wherein the actuator is coupled to the ball body via a valve stem.

16. The valve assembly of claim 15, wherein the actuator is a single actuator configured to move the ball body in a sequence comprising the second axial direction, a rotational direction, and the first axial direction when moving the ball body between open and closed positions.

17. The valve assembly of claim 15, wherein the ball body is substantially spherical.

18. The valve assembly of claim 15, wherein the cavity comprises one or more tapered surfaces that form the seating surfaces.

19. The valve assembly of claim 15, wherein the ball body comprises the valve stem and an axial guide extending along the third central axis, the valve stem extends from a first side of the ball body, the axial guide extends from an opposite second side of the ball body, and the axial guide is disposed within a recess of the valve body.

20. The valve assembly of claim 15, comprising a seal disposed within a groove of each seat of the one or more seats, such that the seal is positioned between the valve body and each seat of the one or more seats.

* * * * *